(12) United States Patent
Yanagi et al.

(10) Patent No.: US 7,745,524 B2
(45) Date of Patent: Jun. 29, 2010

(54) PUNCTURE SEALING AGENT

(75) Inventors: Hideshi Yanagi, Kodaira (JP); Ichirou Yamaguchi, Kodaira (JP); Daisuke Sugio, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/577,801

(22) PCT Filed: Nov. 1, 2005

(86) PCT No.: PCT/JP2005/020111

§ 371 (c)(1),
(2), (4) Date: Jan. 10, 2008

(87) PCT Pub. No.: WO2006/049171

PCT Pub. Date: May 11, 2006

(65) Prior Publication Data

US 2008/0306197 A1     Dec. 11, 2008

(30) Foreign Application Priority Data

Nov. 1, 2004   (JP) ............................. 2004-318085
Jun. 24, 2005  (JP) ............................. 2005-184541

(51) Int. Cl.
  *C08K 5/05*   (2006.01)
  *C08F 236/00*  (2006.01)
(52) U.S. Cl. ....................... 524/386; 526/340
(58) Field of Classification Search .................. 524/386
    See application file for complete search history.

(56) References Cited

U.S. PATENT DOCUMENTS 6,992,119 B2 * 1/2006 Kojima et al. ............... 523/166
2006/0142420 A1 * 6/2006 Nakazawa et al. .......... 523/166

FOREIGN PATENT DOCUMENTS

| JP | 9-118779 A | | 5/1997 |
| JP | 2001-62934 A | | 3/2001 |
| JP | 2001062934 A | * | 3/2001 |
| JP | 2004-35867 A | | 2/2004 |
| WO | 2004048493 A1 | | 6/2004 |

OTHER PUBLICATIONS

Translation of JP 2001062934, Mar. 2001.*
Chinese Office Action dated Jun. 19, 2009.

* cited by examiner

*Primary Examiner*—Ling-Siu Choi
*Assistant Examiner*—Hui Chin
(74) *Attorney, Agent, or Firm*—Sughrue Mion, PLLC

(57) ABSTRACT

A puncture sealing agent that is excellent in storage stability, and good in puncture sealing properties, and the like, is provided.

A puncture sealing agent containing at least a synthetic rubber latex, wherein the gelation ratio as evaluated in a Maron-type mechanical stability test performed in accordance with JIS K 6387 is 0.001 to 10%.

5 Claims, No Drawings

PUNCTURE SEALING AGENT

TECHNICAL FIELD

The present invention relates to a puncture sealing agent for use in sealing a tire that has been punctured.

BACKGROUND ART

In recent years, a variety of puncture sealing agents are available on the market. They mainly contain a colloidal dispersion system polymer in an aqueous medium and are known as latexes. In other words they use, for example, a polyethylene-butadiene latex, a polyvinyl acetate latex, an acrylic copolymer latex, a nitrile latex, an acrylonitrile-butadiene latex, a polychloroprene latex. In addition, also known is a puncture sealing agent containing, as the carrier medium, tetrachloroethylene rather than water.

In order to introduce such a puncture sealing agent into the inside of a tire, and to pump up the tire to a pressure at which it can be used, an apparatus having a pressure-tight container for the puncture sealing agent that contains a liquefied gas as a pressure source, such as a spray can, has been conventionally used. In addition, as the liquefied gas, a propane-butane gas mixture is mainly used, however, fluorochlorohydrocarbons are also used in rare cases. One end of a hose is connected to the spray can with an outlet valve, and a screw adapter for use with a tire valve is attached to the other end of the hose.

When a tire puncture occurs, the puncture sealing agent is squirted out from the spray can into the interior of the tire through the tire valve, and with the propellant gas, the tire is reinflated to a specific pressure level that varies depending upon the amount of gas leakage. At this time, the puncture sealing agent is distributed in the interior of the tire to seal off the damaged portion, while running for a distance of a few km, depending upon the degree of damage to the tire.

In another apparatus, the puncture sealing agent is placed in a compressible flask that is connected, through an adapter, to the tire valve from which a valve insertion has been previously removed. The puncture sealing agent is squirted out into the interior of the tire by compressing the flask. After the valve insertion is inserted, and the tire is reinflated to a specific internal pressure with the aid of carbon dioxide cartridges.

By the way, the puncture sealing agents that have been conventionally used are not fully satisfactory. They can be mechanically removed relatively quickly, and the speed at which the puncture hole is blocked up is slow, thus it takes a considerably long period of time to carry out the preliminary running, for completing the sealing, before real running can be made.

Conventional apparatuses that introduce the puncture sealing agent into the interior of the tire to pump up the tire are also problematic. The temperature at which a spray can, containing a propane-butane gas mixture as the propellant gas, can be used depends upon the mixing ratio. However, unless the temperature falls down to approximately 0° C., the spray can cannot be satisfactorily used. Further, a propane-butane gas mixture is combustible and explosive. Furthermore, a fluorochlorohydrocarbon can have an ill effect on the environment. In addition, all the well-known propellant gases are available only in a limited quantity in the event a puncture occurs.

As a puncture sealing agent and a tire pumping-up apparatus that can solve the above-mentioned problems, for example, the patent literature 1 discloses a puncture sealing agent that includes a rubber latex containing natural rubber latex alone, and has a resin-based adhesive agent that is compatible with this natural rubber latex, and a sealing/pumping-up apparatus that uses this puncture sealing agent.

However, about the above-mentioned conventional puncture sealing agents, it cannot be said that they are sufficient in puncture sealing properties, such as puncture sealing speed, and storage stability in the sense of freedom from coagulation even during long-term storage, and thus there is still room for improvement.

Patent literature 1: Japanese Patent Application No. H09-118779

DISCLOSURE OF THE INVENTION

Problems to be Solved by the Invention

Then, the present invention has been made in view of the above-mentioned problems of the prior art, and what is to be done by the present invention is to achieve the following object.

That is, the object of the present invention is to provide a puncture sealing agent that is excellent in storage stability, and is good in puncture sealing properties, and the like.

Means to Solve the Problems

In order to achieve the above-mentioned object, the present inventors have made vigorous investigation, and as a result, have found that the object can be achieved by the present invention as described below.

That is, the present invention provides:

<1> A puncture sealing agent containing at least a synthetic rubber latex, wherein the gelation rate as evaluated in a Maron-type mechanical stability test performed in accordance with JIS K 6387 is 0.001 to 10%.

<2> The puncture sealing agent of item <1>, wherein the synthetic rubber latex is at least one selected from the group consisting of SBR latex, NBR latex, MBR latex, carboxyl-modified NBR latex, and carboxyl-modified SBR latex.

<3> The puncture sealing agent of item <1> or <2>, containing at least one antifreezing agent at 10 to 50% by mass.

<4> The puncture sealing agent of any one of items <1> to <3>, further containing a resin emulsion.

<5> The puncture sealing agent of any one of items <1> to <4>, further containing an unmodified SBR at 5 to 40% by mass.

<6> The puncture sealing agent of item <4> or <5>, further containing a rosin resin emulsion using a nonionic surfactant at a solid content of 1 to 15% by mass.

<7> The puncture sealing agent of any one of items <3> to <6>, wherein glycol is used as the antifreezing agent.

EFFECTS OF THE INVENTION

According to the present invention, a puncture sealing agent that is excellent in storage stability, and is good in puncture sealing properties, and the like, can be provided.

BEST MODE FOR CARRYING OUT THE INVENTION

The puncture sealing agent of the present invention contains at least a synthetic rubber latex, wherein the gelation rate as evaluated in a Maron-type mechanical stability test performed in accordance with JIS K 6378 is 0.001 to 10%.

The puncture sealing agent of the present invention has a gelation ratio of 0.001 to 10%, thereby improving the puncture sealing properties. Hereinbelow, the principle thereof will be described.

It has become clear that the puncture repair mechanism for a tire using a puncture sealing material proceeds as follows:

(1) A puncture hole in the tire repeatedly opens and closes with the rotation of the tire. When the puncture hole closes, a large shearing force is applied to the wall surface of the puncture hole.

(2) Such a shearing force causes the repair liquid in the puncture hole to be coagulated, and the coagulated rubber latex clogs the puncture hole to complete the repair.

The phenomenon as stated in this paragraph (2) is that which provides the rubber latex with mechanical stability In other words, ordinary rubber latex is stabilized by the repulsive force of the negative charges of the emulsifier molecules that surround the rubber latex particles. If a force greater than this repulsive force is applied, the particles are brought into contact with one another, resulting in the rubber latex being coagulated. In the tire repair, the coagulum becomes easier-to-be-produced by the above-mentioned phenomenon, in other words, the lower the mechanical stability of the puncture sealing agent is, the higher the sealability thereof will be. The gelation ratio for the latex, as evaluated in a Maron-type mechanical stability test that is a measure of such mechanical stability, has a close correlation with the running distance required for tire repair. That is, the lower the mechanical stability of a puncture sealing agent as evaluated in a Maron-type mechanical stability test, the higher the sealing speed at which the puncture sealing agent seals a puncture hole will be. Then, because the gelation rate is 0.001 to 10% in the present invention, puncture sealing properties are enhanced.

In the present invention, the gelation rate is a value as evaluated in a Maron-type mechanical stability test performed in accordance with JIS K 6387 under the following conditions:

[Conditions]
Amount of puncture sealing agent: 100 g
Load: 30 kgf
Rotor speed: 1000 rpm
Time period: 5 min In the present invention, making the gelation rate be in the range of 0.01 to 10% involves adjusting the type of a surfactant (such as, the chemical structure, the molecular chain length, the number of polar groups) and the amount thereof, and controlling the type of the substituent for end modification of the latex polymer (the chemical structure, the branch chain length, and the acid-modified monomer species) and the amount thereof.

Examples of the surfactant include anionic, cationic, and nonionic ones, however, among them, using the anionic one is preferable. Examples of the anionic surfactant include alkylbenzene sulfonates, such as sodium dodecylbenzene sulfonate; alkyl sulfates, such as sodium lauryl sulfate and sodium tetradecyl sulfate; abietic acid ester salts, such as sodium dioctyl sulfosuccinate and sodium dehydroabietic acid rosin ester; sulfosuccinates, such as sodium dihexylsulfosuccinate; aliphatic acid salts, such as sodium laurate and semi-cured beef tallow aliphatic acid potassium salt; ethoxy sulfate salts, such as polyoxy ethylene lauryl ether sulfate sodium salt and polyoxy ethylene nonylphenyl ether sulfate sodium salt; alkane sulfonates; alkyl ether phosphate ester sodium salts. The anionic surfactant is selected from these. The use amount depends on the polymerization method of the latex but is ordinarily in the range of 0.2 to 5.0%. A combination of more than one surfactant may be used. In addition, in order to secure the stability in the antifreezing fluid, a nonionic surfactant, such as polyoxy ethylene nonylphenyl ether or polyoxy ethylene sorbitane lauryl ester, may be appropriately used in combination with the anionic emulsifier.

In addition, in order to hold the mechanical stability at a low level, it is recommended to minimize the amount of substituent for end modification of the latex polymer latex, however, to secure the storage stability, a small amount of substituent, such as carboxylic acid or sulfonic acid, may be introduced.

As described above, the gelation rate is 0.001 to 10% in the puncture sealing agent of the present invention. If the gelation rate is under 0.001%, the amount of coagulum of the latex that is formed by the deformation of a puncture hole at the time of repair will be too small to make it possible to seal the puncture hole. On the other hand, if the gelation rate exceeds 10%, the stability of the particles will be too low, resulting in coagulation occurring at the time of long-term storage, which makes it impossible to use the puncture sealing agent.

The gelation rate is preferably 0.01 to 8%, and more preferably 0.1 to 7%.

In addition, the viscosity of the puncture sealing agent is preferably 3 to 6000 mPa·s under the condition of 60° C. to −30° C., which can be assumed to be the actual operating condition.

If the viscosity of the puncture sealing agent is under 3 mPa·s, it may be too low, resulting in liquid leak occurring at the time of injection into the valve in some cases. If the viscosity exceeds 6000 mPa·s, the resistance at the time of injection may increase, which results in the ease of injection being lowered, and the spread to the tire inner surface of the tire may be insufficient, resulting in a high sealability being not obtained. The viscosity can be measured with a B-type viscosimeter, or the like.

Various latexes can be used as the synthetic rubber latex in the present invention, however, from the viewpoint of securing good sealability, it is preferable to use at least one type which is selected from the group consisting of SBR latex, NBR latex, MBR latex, BR latex, carboxyl-modified NBR latex, and carboxyl-modified SBR latex.

The puncture sealing agent of the present invention preferably contains an antifreezing agent. The antifreezing agent is not particularly limited, and ethylene glycol, propylene glycol, and the like may be used as such. The content of such an antifreezing agent is preferably 10 to 50% by mass. If it is under 10% by mass, a sufficient freeze-preventing property may not be obtained at a low temperature. If the content exceeds 50% by mass, the amount of glycol is large with respect to the amount of rubber latex, thus at the time of puncture repair, the aggregated particles of the rubber latex are dispersed in the glycol, which may prevent a sufficient sealing characteristic from being obtained.

The puncture sealing agent of the present invention may contain water for thinning. Further, into the puncture sealing agent, an ordinary dispersing agent, emulsifier, foam stabilizer, or pH adjusting agent, such as ammonia or caustic soda, may be added.

In addition, the puncture sealing agent of the present invention preferably contains a resin emulsion in order to improve the sealability. As the resin emulsion, those which use a plant-derived resin (such as, a rosin acid ester, a tall oil ester resin, a terpene resin, including terpene phenol), those which use a synthetic resin, such as a modified phenolic resin or a petroleum resin, or the like may be used. The emulsion which uses a rosin resin or a phenol resin can be particularly preferably used among these, because it provides a great effect of strength improvement. These resin emulsions preferably use a nonionic surfactant as the emulsifier from the viewpoint of stability In the case where an anionic surfactant or a cationic surfactant is used as the main emulsifier, mixing an antifreezing agent will make the emulsion unstable, resulting in it being broken.

The resin emulsion or phenolic resin emulsion is preferably contained at a solid content of 1 to 15% by mass; is more preferably contained at 2 to 12% by mass; and is still more preferably contained at 3 to 9% by mass. If the content is under 1% by mass, the above-mentioned effect cannot be sufficiently obtained. If the content exceeds 15% by mass, the content of resin is too high, resulting in the rubber becoming hard, which causes the sealed puncture part not to be able to conform to the tire, lowering the sealability.

Further, the puncture sealing agent of the present invention preferably contains an unmodified SBR at 5 to 40% by mass; more preferably contains it at 8 to 35% by mass; and still more preferably contains it at 10 to 30% by mass. If the content of the unmodified SBR is under 5% by mass, the sealability will be low, which makes it impossible to obtain a sufficient sealing effect. In addition, if the content exceeds 40% by mass, the stability will degrade, resulting in gelation being rapidly caused.

As the method for repairing a puncture using the puncture sealing agent as described above, a well-known method can be applied. In other words, a container filled with the puncture sealing agent is firstly inserted into the valve port of a tire to inject a proper quantity of the puncture sealing agent. Thereafter, the tire is rotated such that the puncture sealing agent is spread on the tire inner surface to seal the puncture hole.

In addition, the puncture sealing agent of the present invention can be applied to puncture repair of various pneumatic tires. The application include tires for automobiles, tires for two-wheeled vehicles, tires for unicycles, tires for wheelchairs, tires for vehicles to be used for farm land operation and gardening.

The puncture sealing agent itself of the present invention can be introduced into the interior of the tire, using various pumping-up apparatuses, such as a spray can containing a propane-butane mixed gas as a propellant gas, to cause the tire to be reinflated.

EXAMPLES

Hereinbelow, the present invention will be specifically described with reference to the examples, but the present invention is not limited to these.

Examples 1 to 13 and Comparative Examples 1 to 6

The materials as given in the following Table 1 to Table 3 were mixed at the contents given in each of them to prepare puncture sealing agents of Examples 1 to 13 and Comparative Examples 1 to 6.

TABLE 1

|  | EX. 1 | EX. 2 | EX. 3 | EX. 4 | COMP. EX. 1 | COMP. EX. 2 | COMP. EX. 3 | COMP. EX. 4 |
|---|---|---|---|---|---|---|---|---|
| Latex species | modified SBR | SBR | BR | SBR | NBR | SBR | SBR | SBR |
| Solid content (% by mass) | 23 | 20 | 20 | 40 | 20 | 40 | 40 | 40 |
| Antifreezing agent species | PG | PG | PG | PG | EG | PG | PG | PG |
| Amount of antifreez agent (% by mass) | 40 | 45 | 40 | 45 | 40 | 20 | 45 | 45 |
| Water (% by mass) | 37 | 35 | 40 | 35 | 40 | 20 | 35 | 35 |
| Mallon test gelation stability (%) | 5 | 1.10 | 6.7 | 10.0 | 0.0005 | 25 | 0.0009 | 10.5 |
| Puncture sealing properties | B | B | B | B | D | B | D | B |
| Storage stability | A | A | A | A | A | B | A | B |

(Unit: % by mass)
EG: Ethylene glycol
PG: Propylene glycol

TABLE 2

|  | EX. 5 | EX. 6 | EX. 7 | EX. 8 | EX. 9 |
|---|---|---|---|---|---|
| Latex species | SBR | SBR | SBR | SBR | SBR |
| Solid content (% by mass) | 15 | 15 | 15 | 15 | 15 |
| Resin emulsion (% by mass) | rosin resin 1 | rosin resin 5 | rosin resin 18 | modified phenol 8 | not given — |
| Antifreezing agent species | PG | PG | PG | PG | PG |
| Amount of antifreezing agent (% by mass) | 45 | 45 | 35 | 45 | 45 |
| Water (% by mass) | 39 | 35 | 32 | 35 | 40 |
| Mallon test gelation stability (%) | 1.05 | 1.10 | 1.30 | 1.20 | 1.01 |
| Puncture sealing properties | B | A | C | A | C |
| Storage stability | A | A | A | A | A |

(Unit: % by mass)
PG: Propylene glycol

TABLE 3

|  | EX. 10 | EX. 11 | EX. 12 | EX. 13 | COMP. EX. 5 | COMP. EX. 6 |
|---|---|---|---|---|---|---|
| Latex species | SBR | SBR | SBR | SBR | SBR | SBR |
| Solid content (% by mass) | 20 | 20 | 20 | 20 | 20 | 20 |
| End modification | — | — | — | carboxy-modified 0.5% | — | carboxy-modified 2.0% |
| Surfactant | dehydro-abietic acid rosin ester | dehydro-abietic acid rosin ester | dehydro-abietic acid rosin ester | — | — | — |
| (% by mass) | 1.0 | 5.0 | 10.0 | — | — | — |
| Antifreezing agent species | PG | PG | PG | PG | PG | PG |
| Amount of antifreezing agent (% by mass) | 45 | 45 | 45 | 45 | 45 | 45 |
| Water (% by mass) | 35 | 35 | 35 | 35 | 35 | 35 |
| Mallon test gelation stability (%) | 0.570 | 0.10 | 0.006 | 0.10 | 12.0 | 0.0007 |
| Puncture sealing properties | B | B | C | B | B | D |
| Storage stability | A | A | A | A | B | A |

(Unit: % by mass)
PG: Propylene glycol

[Evaluation]

The prepared puncture sealing agents were evaluated for the following evaluation items:

Puncture Sealing Properties:

A hole of 2.6 mm in diameter was drilled in a tire of 195/65R15; 450 ml of the prepared puncture sealing agent was injected thereinto; and the tire internal pressure was raised to 0.2 MPa and the tire was attached to vehicle. Thereafter, the vehicle was run at a speed of 60 km/h or lower. The tire with which the internal pressure drop ceased within 3 km with the puncture sealing agent being fully cured was evaluated to be excellent, which is expressed by a marking of A in table; the tire with which the internal pressure drop ceased within 5 km with the puncture sealing agent being fully cured was evaluated to be good, which is expressed by a marking of B in table; the tire with which the internal pressure drop ceased within 10 km with the puncture sealing agent being fully cured was evaluated to be fair, which is expressed by a marking of C in table; and the tire with which the internal pressure was dropped, and it was determined that air leakage was caused from the repaired portion was evaluated to be poor, which is expressed by a marking of D in table. The results are given in Table 1 to Table 3.

Storage Stability:

The prepared puncture sealing agents were stored for 60 days at an ambient temperature of 80° C. After the storage, whether a gelated substance exists was visually checked, and the case where no gelated substance existed was evaluated to be good, which is expressed by a marking of A in table, while the case where gelated substance existed was evaluated to be poor, which is expressed by a marking of B in table. The results are given in Table 1 to Table 3.

As can be seen from the results as given in Tables 1 to 3, the puncture sealing agents in Examples 1 to 13 provides a good result in both puncture sealing properties and storage stability, while the puncture sealing agents in Comparative Examples 1 to 6 provides a poor result in either puncture sealing properties or storage stability.

In addition, Example 7 in which the content of resin emulsion exceeds the preferred range, and Example 9 in which no resin emulsion is contained are slightly inferior to the other Examples in puncture sealing properties.

What is claimed is:

1. A puncture sealing agent comprising:
   at least a synthetic rubber latex, and
   a resin emulsion, wherein
   the gelation ratio as evaluated in a Maron-type mechanical stability test performed in accordance with JIS K 6387 is 0.001 to 10%, and
   the resin emulsion is a rosin resin emulsion or a phenolic resin emulsion using a nonionic surfactant, at a solid content of 1 to 9% by mass.

2. The puncture sealing agent of claim 1, wherein the synthetic rubber latex is at least one selected from the group consisting of SBR latex, NBR latex, MBR latex, BR latex, carboxyl-modified NBR latex, and carboxyl-modified SBR latex.

3. The puncture sealing agent of claim 1, comprising at least one antifreezing agent at 10 to 50% by mass.

4. The puncture sealing agent of claim 1, further comprising unmodified SBR at 5 to 40% by mass.

5. The puncture sealing agent of claim 3, wherein glycol is used as the antifreezing agent.

\* \* \* \* \*